Oct. 6, 1931.  F. A. SELJE  1,825,679

TRUNK RACK

Filed Nov. 17, 1927

FREDERICK A. SELJE. INVENTOR
BY
Irving Harness
ATTORNEY

Patented Oct. 6, 1931

1,825,679

UNITED STATES PATENT OFFICE

FREDERICK A. SELJE, OF DETROIT, MICHIGAN, ASSIGNOR TO CHRYSLER CORPORATION, OF DETROIT, MICHIGAN, A CORPORATION OF DELAWARE

TRUNK RACK

Application filed November 17, 1927. Serial No. 233,756.

This invention relates to a trunk support for an automobile, and particularly one adapted for use at the rear of the vehicle.

An important object of the invention is to provide a support of rigid construction having rearwardly extending arms which may be folded inwardly when they are not in use as a trunk support.

Another object of the invention is to provide a support which may be readily secured to a vehicle frame construction without alteration of the frame. These and other objects of the invention will more fully appear from the following description taken in connection with the accompanying drawings in which.

Figure 1:
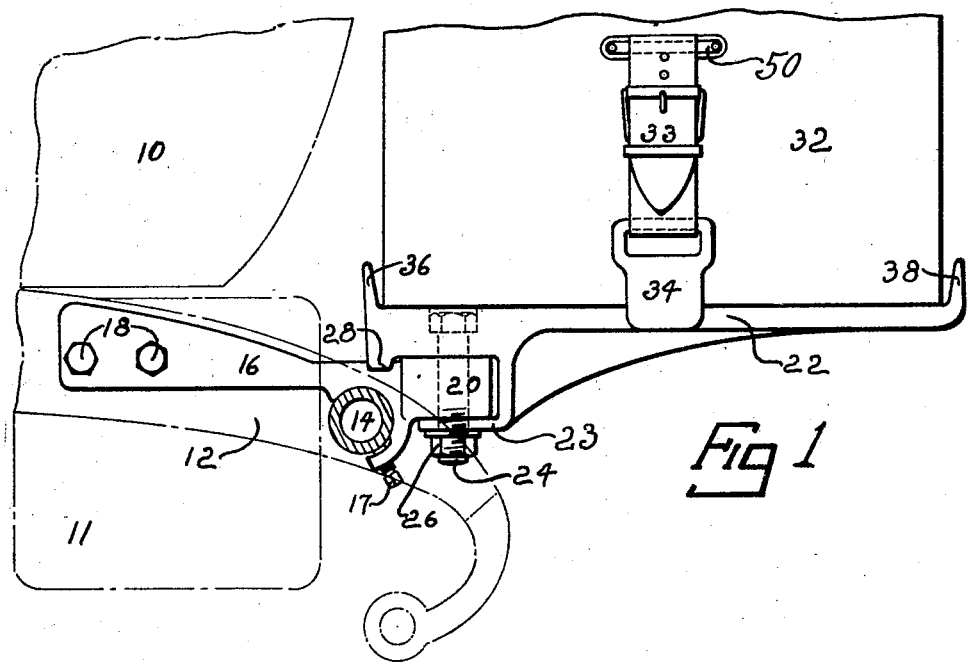
Fig. 1 is a side elevation of the support showing a trunk thereon, portions of the vehicle being shown by dot and dash lines and a frame rear cross member being shown in section.

Referring to the drawings, I have shown an automobile body 10, gas tank 11 and frame 12 of conventional design. The frame 12 is built up of channel shaped side members 13 spaced apart at the rear end by a tubular cross member 14.

The attaching portion of the trunk support comprises a pair of brackets 16 which are adapted to fit over the cross member 14; the latter being received in semicylindrical bearing surface in each bracket 16. Set screws 17 at one side of each bearing surface secure the brackets to the cross member 14. The brackets 16 are secured to the side frame member 13 by bolts 18. The outer ends of the brackets 16 are provided with portions 20 which serve as bearings for trunk supporting arms 22 of the trunk support. The portions 20 have upper and lower flat faces and a vertical opening extending therethru.

The arms are pivotally secured to the bearing portion 20 so that the arms may be swung in a horizontal plane. A flange 23 extending downwardly and rearwardly is so shaped as to produce, in effect, a yoke or to form a space between itself and the body of each arm 22 for the reception of the bearing portion 20.

The top portions of the arms rest on the upper surfaces of the portions 20 and the flanges or bottom portions engage the lower surface thereof. Bolts 24 extending thru openings in the arms and brackets have their heads recessed in the arms 22 to prevent their turning and nuts 26 on the bolts 24 pinch the bearing portion 20 in the yoke to clamp the arms in any desired position.

Stops 28 and 30 have been provided on each arm 22 to limit the swinging movement of the arms in either direction.

Upturned ends 36 and 38 prevent rearward or forward movement of a trunk 32 which may be secured on the arms 22 by straps 33, secured to eyes 50 on the trunk and to strap eyes 34 on the arms 22.

Figure 2:
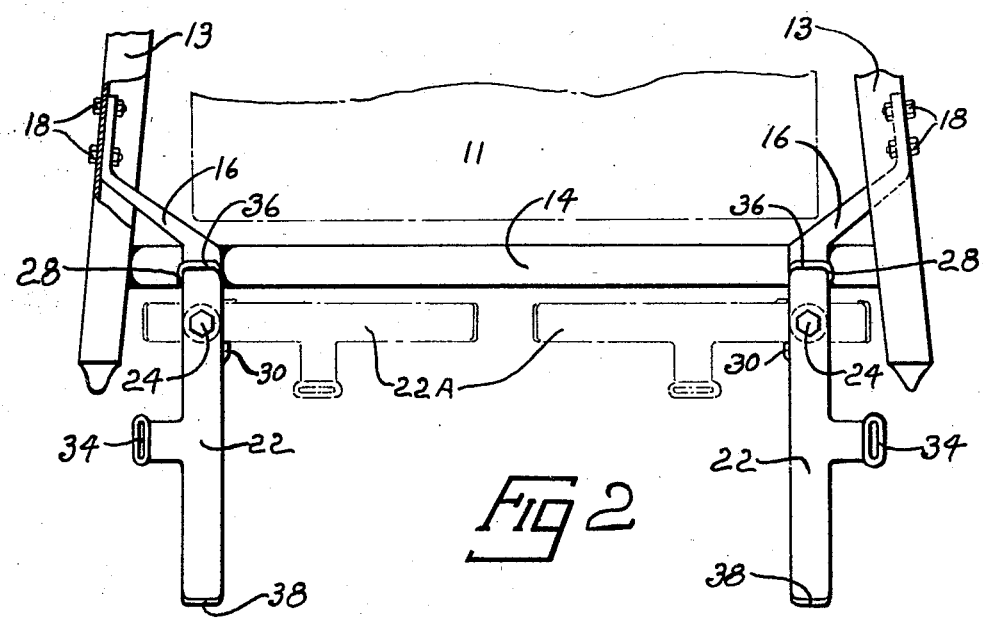
Fig. 2 is a plan view of Fig. 1; the frame being in full lines partly broken away, the supporting arms being shown in supporting position by the full lines and in their closed position by the dot and dash lines.

When the trunk is removed the nuts 26 may be loosened and the arms 22 swung to the position shown by the dot and dash lines as at 22A in Fig. 2.

The swinging of the supporting arms permits adjustment to receive various sizes of trunks and further permits the folding of the supports out of the way when they are not in use.

It is to be understood that various changes, including the size, construction and arrangement of parts, may be made without departing from the spirit of my invention and it is not my intention to limit its scope other than by the terms of the appended claims.

What I claim is:

1. A device of the class described comprising, a pair of brackets each having a depressed portion adapted to seat on the rear cross member of a vehicle frame and adapted to be secured to side frame members of said frame, supporting arms pivoted intermediate their ends on said brackets adapted to swing in a horizontal plane, seats on said arms extending on opposite sides of their pivots for supporting a trunk and means for securing said arms in one of several positions.

2. A device of the class described comprising, a pair of inwardly offset brackets adapted to be secured to the side frame member of a vehicle frame and adapted to embrace a portion of the rear cross member, a bearing portion at the outer end of said brackets, a pair of arms each having a yoke on their lower sides intermediate their ends for receiving said bearing portions, one of said arms being pivotally secured to each of said bearing portions, seats on the upper sides of said arms extending on both sides of said yoke, means carried by said arms for securing a trunk thereto, means for limiting the swinging movement of said arms in either direction, and means for securing said arms in one of several positions from a position perpendicular to said rear cross member to a position parallel to said rear cross member.

3. A construction of the class described comprising a pair of brackets, each having a frame engaging portion and a recessed portion for engaging a frame cross member, a pair of trunk supporting arms pivotally secured intermediate their ends to said brackets, and a seat on each of said arms extending on opposite sides of the pivoted portion thereof.

4. A device of the class described comprising, a pair of brackets adapted to be secured to substantially parallel vehicle frame members, each having a depressed portion adapted to seat on the rear cross member of the vehicle frame members, a screw threaded member projecting into the depression for engagement with the rear cross member, and trunk supporting arms pivoted at the outer ends of said brackets having seat portions directly above the outer ends of said brackets, said arms being adapted to swing in a horizontal plane, and means for securing said arms in one of several positions.

FREDERICK A. SELJE.